United States Patent
Bainville et al.

(10) Patent No.: US 10,970,078 B2
(45) Date of Patent: Apr. 6, 2021

(54) COMPUTATION ENGINE WITH UPSIZE/INTERLEAVE AND DOWNSIZE/DEINTERLEAVE OPTIONS

(71) Applicant: Apple Inc., Cupertino, CA (US)

(72) Inventors: Eric Bainville, Sunnyvale, CA (US); Tal Uliel, San Francisco, CA (US); Jeffry E. Gonion, Campbell, CA (US); Ali Sazegari, Los Altos, CA (US); Erik K. Norden, San Jose, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 15/946,719

(22) Filed: Apr. 5, 2018

(65) Prior Publication Data

US 2019/0310854 A1 Oct. 10, 2019

(51) Int. Cl.
*G06F 9/30* (2018.01)
*G06F 9/38* (2018.01)

(52) U.S. Cl.
CPC .......... *G06F 9/3836* (2013.01); *G06F 9/3001* (2013.01); *G06F 9/3004* (2013.01); *G06F 9/30025* (2013.01); *G06F 9/30036* (2013.01); *G06F 9/3877* (2013.01)

(58) Field of Classification Search
CPC . G06F 9/30025; G06F 9/30036; G06F 9/3893
See application file for complete search history.

(56) References Cited

U.S. PATENT DOCUMENTS

| | | |
|---|---|---|
| 4,719,588 A | 1/1988 | Tatemichi et al. |
| 5,025,407 A | 6/1991 | Gulley et al. |
| 5,852,444 A | 12/1998 | Lippincott |
| 5,901,422 A | 5/1999 | White et al. |
| 5,903,769 A | 5/1999 | Arya |

(Continued)

FOREIGN PATENT DOCUMENTS

| | | |
|---|---|---|
| CN | 106445471 | 2/2017 |
| EP | 0468820 B1 | 1/1992 |

(Continued)

OTHER PUBLICATIONS

Song Han et al: EIE: Efficient Interence Engine on Compressed Deep Neural Networks, ACM SIGARCH Computer Architecture News, ACM Special Interset Group on Computer Archtecture, 2 Penn Plaza, Suite 701 New York NY 10121-0701 USA, Stanford University, 2016, 12 pages.

(Continued)

*Primary Examiner* — Jacob Petranek
(74) *Attorney, Agent, or Firm* — Kowert, Hood, Munyon, Rankin & Goetzel, P.C; Lawrence J. Merkel

(57) ABSTRACT

In an embodiment, a computation engine may perform computations on input vectors having vector elements of a first precision and data type. The computation engine may convert the vector elements from the first precision to a second precision and may also interleave the vector elements as specified by an instruction issued by the processor to the computation engine. The interleave may be based on a ratio of a result precision and the second precision. An extract instruction may be supported to extract results from the computations and convert and deinterleave the vector elements to provide a compact result in a desired order.

19 Claims, 8 Drawing Sheets

(56) References Cited

U.S. PATENT DOCUMENTS

| | | |
|---|---|---|
| 6,675,187 B1 | 1/2004 | Greenberger |
| 6,901,422 B1 | 5/2005 | Sazegari |
| 6,922,716 B2 | 7/2005 | Desai et al. |
| 6,959,378 B2 | 10/2005 | Nickolls et al. |
| 7,337,205 B2 | 2/2008 | Sazegari |
| 7,668,894 B2 | 2/2010 | Sazegari et al. |
| 7,873,812 B1 | 1/2011 | Mimar |
| 9,235,414 B2 | 1/2016 | Gopal et al. |
| 9,600,281 B2 | 3/2017 | Eichenberger et al. |
| 9,658,986 B2 | 5/2017 | Ge et al. |
| 10,089,278 B2 | 10/2018 | Moskovich et al. |
| 10,346,163 B2 | 7/2019 | Bainville et al. |
| 2003/0188127 A1* | 10/2003 | So ........................ G06F 9/3861 712/34 |
| 2003/0221086 A1 | 11/2003 | Simovich et al. |
| 2004/0268094 A1 | 12/2004 | Abdallah et al. |
| 2005/0125631 A1 | 6/2005 | Symes et al. |
| 2005/0203980 A1 | 9/2005 | Harrison et al. |
| 2005/0225562 A1 | 10/2005 | Higgins et al. |
| 2009/0024685 A1 | 1/2009 | Salama et al. |
| 2009/0030960 A1 | 1/2009 | Geraghty |
| 2009/0100247 A1 | 4/2009 | Moyer et al. |
| 2010/0274990 A1 | 10/2010 | Wilder |
| 2011/0153707 A1 | 6/2011 | Ginzburg et al. |
| 2012/0254591 A1* | 10/2012 | Hughes ............... G06F 9/30018 712/205 |
| 2012/0254592 A1* | 10/2012 | San Adrian ......... G06F 9/30018 712/205 |
| 2013/0159665 A1 | 6/2013 | Kashyap |
| 2013/0198495 A1 | 8/2013 | Vick et al. |
| 2014/0019720 A1* | 1/2014 | Sprangle ............ G06F 9/30025 712/206 |
| 2014/0229716 A1 | 8/2014 | Gueron et al. |
| 2015/0012724 A1* | 1/2015 | Lutz ..................... G06F 9/3887 712/22 |
| 2017/0031682 A1* | 2/2017 | Eapen ................ G06F 9/30036 |
| 2017/0102892 A1 | 4/2017 | Pusukuri et al. |
| 2017/0192781 A1 | 7/2017 | Valentine et al. |
| 2018/0032312 A1 | 2/2018 | Hansen et al. |
| 2018/0074824 A1 | 3/2018 | Sazegari |
| 2018/0107630 A1 | 4/2018 | Zhou et al. |
| 2018/0137075 A1 | 5/2018 | Linderman et al. |
| 2018/0321937 A1* | 11/2018 | Brown ................ G06F 9/30014 |
| 2018/0357064 A1* | 12/2018 | Chen ..................... G06F 9/3867 |
| 2019/0065150 A1 | 2/2019 | Heddes et al. |
| 2019/0065190 A1 | 2/2019 | Zhang et al. |
| 2019/0079903 A1 | 3/2019 | Dreyer et al. |
| 2019/0102178 A1 | 4/2019 | Zbiciak |

FOREIGN PATENT DOCUMENTS

| | | |
|---|---|---|
| EP | 3051412 A1 | 8/2016 |
| WO | 2017185389 A1 | 11/2017 |

OTHER PUBLICATIONS

Shaoli Liu et al., "Cambricon," ACM Sigarch Computer Architecture News, ACM Special Interest Group on Computer Architecture, 2 Penn Plaza, Suite 701 New York, NY 10121-0701 USA, vol. 44, No. 3, Jun. 18, 2016 (2016-06-180, pp. 393-405, XP058300636, ISSN:0163-5964, DOI: 10:1145/3007787.3001179.

Tang et al., "Table-Lookup Algorithms for Elementary Functions and Their Error Analysis", 1991, pp. 232-236.

Kantabutra, "On Hardware for Computing Exponential and Trigonometric Functions", Mar. 1996, pp. 328-339.

ISR/WO, PCT/US2019/042744, dated Oct. 23, 2019, 15 pages.

* cited by examiner

| X0Y0 | X2Y2 | X4Y4 | X6Y6 | 16 -> 8 |
| X1Y1 | X3Y3 | X5Y5 | X7Y7 | 68 |
| X0Y0 | X1Y1 | X2Y2 | X3Y3 | X4Y4 | X5Y5 | X6Y6 | X7Y7 | 80 |
| X0Y0 | X2Y1 | X4Y2 | X6Y3 | 16 -> 8 |
| X1Y0 | X3Y1 | X5Y2 | X7Y3 | 70 |
| X0Y0 | X1Y0 | X2Y1 | X3Y1 | X4Y2 | X5Y2 | X6Y3 | X7Y3 | 82 |
| X0Y0 | X4Y4 | 32 -> 8 |
| X1Y1 | X5Y5 | 72 |
| X2Y2 | X6Y6 | |
| X3Y3 | X7Y7 | |
| X0Y0 | X1Y1 | X2Y2 | X3Y3 | X4Y4 | X5Y5 | X6Y6 | X7Y7 | 84 |
Fig. 6

| Instruction | Description |
|---|---|
| LoadX Xn | Load X memory from main memory at pointer Xn |
| LoadY Xn | Load Y memory from main memory at pointer Xn |
| StoreX Xn | Store X memory to main memory at pointer Xn |
| StoreY Xn | Store Y memory to main memory at pointer Xn |
| ExtractZ<p><d> Xn | Store Z memory to Xn. Down convert based on <p>, Deinterleave based on <d>. |
| Compute<px> <py><pz><ix> <iy> Xn, Yn [table] | Compute X and Y, Sum with Elements of Z. <px> indicates x input precision, <py> indicates y input precision, and <pz> indicates output precision (e.g. 8, 16, or 32 bit). <ix> indicates interleave for x and <iy> indicates interleave for <iy> or can be inferred from sizes and have <i> to request interleave or not. [table] specifies lookup table. |

COMPUTATION ENGINE WITH UPSIZE/INTERLEAVE AND DOWNSIZE/DEINTERLEAVE OPTIONS

BACKGROUND

Technical Field

Embodiments described herein are related to computation engines that assist processors and, more particularly, to computation engines that include upsize/interleave and downsize/deinterleave functionality.

Description of the Related Art

A variety of workloads being performed in modern computing systems rely on massive numbers of computations on relatively small numbers. For example, certain long short term memory (LSTM) learning algorithms are used in a variety of contexts such as language detection, card readers, natural language processing, handwriting processing, and machine learning, among other things. LSTM processing includes numerous multiplications and accumulations, where at least one source (e.g. the "weights" applied to the input values) are small (e.g. 8 bit integers, or even smaller in some cases). Other sources may have small numbers as well. Small numbers are numbers with a low range from minimum to maximum, whereas large numbers have a higher range. Additionally, large numbers have more bits, which contributes to the accuracy of computations performed on the numbers. The size (in bits) or width of a value is referred to herein as the precision of the value.

General purpose processors (e.g. central processing units, or CPUs), even with vector instructions in the CPU instruction set, tend to exhibit very low performance on the above types of workloads; while the power consumption is very high. Low performance, high power workloads are problematic for any computing system, but are especially problematic for battery-powered systems such as mobile devices.

SUMMARY

In an embodiment, a computation engine may offload work from a processor (e.g. a CPU) and efficiently perform computations such as those used in LSTM and other workloads at high performance. In an embodiment, the computation engine may perform computations on input vectors having vector elements of a first precision and data type, but the input operands to the operations are a second precision of the data type. The computation engine may convert the vector elements from the first precision to the second precision, and may also interleave the vector elements as specified by an instruction issued by the processor to the computation engine. The interleave may be based on a ratio of a result precision of the operation and the second precision. More particularly, in an embodiment, the instruction may specify at least two input vectors, each of which may have different precisions in some cases. The computation engine may convert each set of vector elements to the second precision (or to separate precisions, if multi-precision computation is performed such as an 8 bit by 16 bit multiply). The computation may interleave the elements of each vector based on the ratio of the corresponding precision and the result precision. Thus, the interleave may differ for each input vector. A second instruction (e.g. an extract instruction, in an embodiment) may be supported to extract results from the computations and convert and deinterleave the vector elements to provide a compact result in a desired order. High precision computation may be supported, and precisions that are useful for the overall process being performed (e.g. the weights of the LSTM procedure) may be maintained outside of the computation engine, in an embodiment.

BRIEF DESCRIPTION OF THE DRAWINGS

The following detailed description makes reference to the accompanying drawings, which are now briefly described.

FIG. 6 is a block diagram illustrating one embodiment of various precisions in the Z memory and downsize/deinterleave operations based on the precisions and/or previous interleaving.

FIG. 7 is a table of instructions which may be used for one embodiment of the processor and computation engine.

Figure 1:
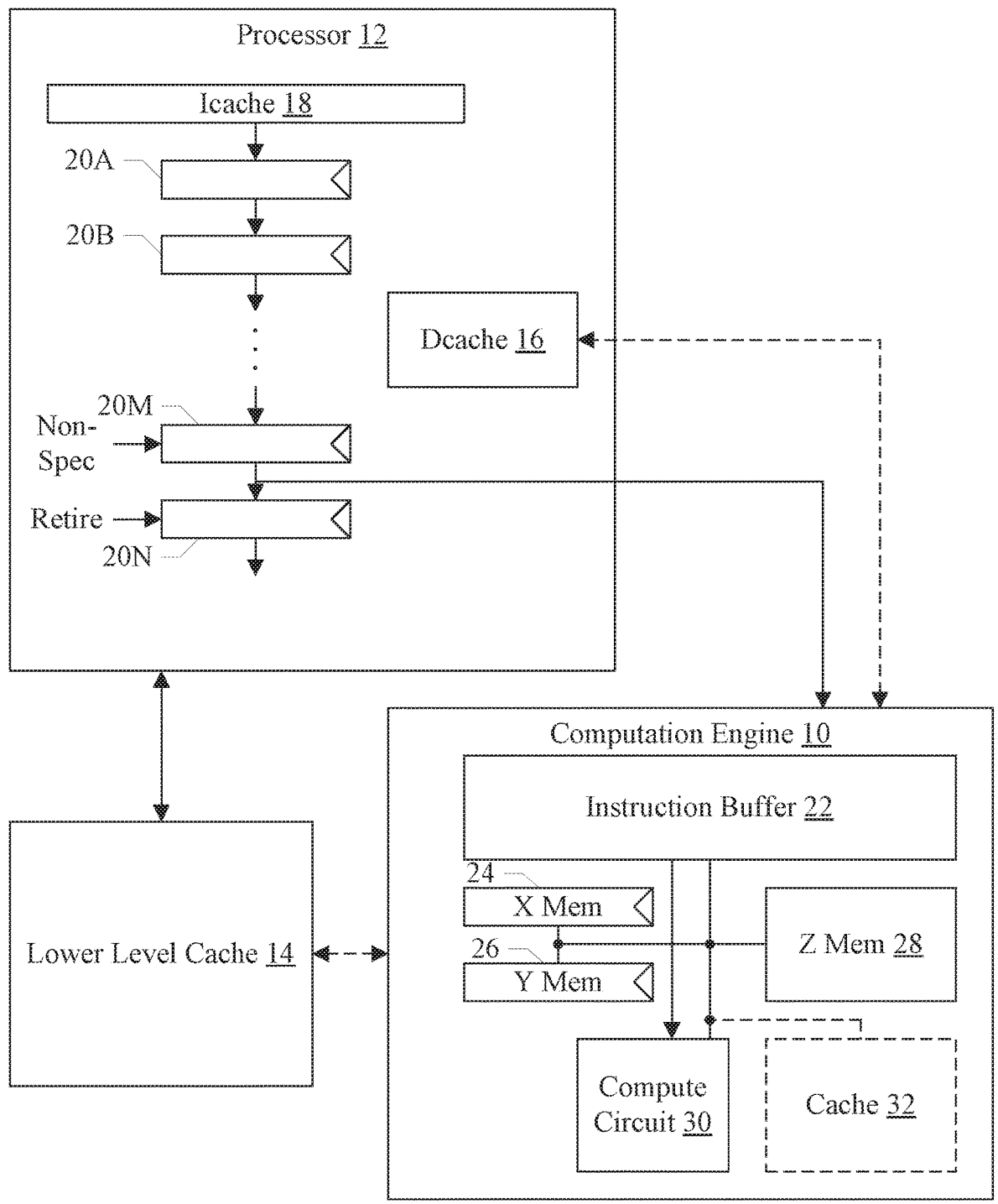
FIG. 1 is a block diagram of one embodiment of a processor, a computation engine, and a lower level cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Turning now to FIG. 1, a block diagram of one embodiment of an apparatus including a processor 12, a computation engine 10, and a lower level cache 14 is shown. In the illustrated embodiment, the processor 12 is coupled to the lower level cache 14 and the computation engine 10. In some embodiments, the computation engine 10 may be coupled to the lower level cache 14 as well, and/or may be coupled to a data cache (DCache) 16 in the processor 12. The processor 12 may further include an instruction cache (ICache) 18 and one or more pipeline stages 20A-20N. The pipeline stages 20A-20N may be coupled in series. The computation engine 10 may include an instruction buffer 22, an X memory 24, a Y memory 26, a Z memory 28, and a compute circuit 30 coupled to each other. In some embodiments, the computation engine 10 may include a cache 32.

The computation engine 10 may be configured to perform one or more computation operations. The computation engine 10 may employ an instruction set, which may be a subset of the instruction set implemented by the processor 12. The processor 12 may recognize instructions implemented by the computation engine 10 and may communicate the instructions to the computation engine 10.

In one embodiment, the computation operations specified by the instructions implemented in the computation engine 10 may be performed on vectors of input operands. For example, an embodiment receives vectors of operands from the X memory 24 and the Y memory 26. The compute circuit 30 may include an array of circuits to perform the operations. Each circuit may receive a vector element from the X memory 24 and a vector element from the Y memory 26, and may evaluate the operation on the vector elements. In an embodiment, the result of the operation may be accumulated with the current value in a corresponding location in the Z memory 28, for write back to the corresponding location in the Z memory 28.

In an embodiment, the computation engine 10 may support various data types and data sizes (or precisions). For example, floating point and integer data types may be supported. The floating point data type may include 16 bit, 32 bit, and 64 bit precisions. The integer data types may include 8 bit and 16 bit precisions, and both signed and unsigned integers may be supported. Other embodiments may include a subset of the above precisions, additional precisions, or a subset of the above precisions and additional precisions (e.g. larger or smaller precisions). Particularly, even smaller integer/floating point precisions may be supported using the upsize and downsize features described below.

The instructions may specify a result precision for the result of the instruction. For example, the above precisions for floating point may be supported for result precisions. Integer result precisions may include 16 bit and 32 bit, in an embodiment. The input vector elements may be of a different precision (e.g. a smaller precision). The computation engine 10 may be configured to convert (e.g. upsize) the input vector elements to the result precision or to an intermediate precision defined by the instruction. For example, in an embodiment, a lookup table may be used to convert from the input precision to the intermediate/result precision. Additionally, an interleave specification may correspond to the instruction, and the computation engine 10 may be configured to interleave the input vector elements according to the interleave specification prior to transmitting the input vector elements to the array of circuits in the compute circuit 30. The interleave may be based on a ratio of the result precision to the intermediate precision. For example, if the result precision is twice the intermediate precision, the interleave may be every second element. If the result precision is four times the intermediate precision, the interleave may be every fourth element. The interleave may properly align the input vector elements to perform the computations and have the results written to the correct locations in the Z memory 28 based on the result precision. Viewed in another way, once the compute circuit 30 operates on the input vector elements to produce a result at the larger result precision, more space in the Z memory 28 may be consumed to store the results than the space consumed by the input vector elements. The interleaving causes the vector elements to be routed to the correct circuits in the array within the compute circuit 30 to be accumulated with like elements of previously input vectors, and the entirety of the result may be in a logical order in the Z memory 28.

As one example of the use of an intermediate precision, consider input vector elements that are 2-bit integers, with an intermediate precision of 8 bits and an output precision of 32 bits. For this example, the 2-bit integers may be upsized to 8-bit integers. More particularly, the 2-bit integers may be mapped to 8-bit integers in a lookup table. In an embodiment, the lookup or other upsizing may be viewed as a conversion. The interleave specification is 4, and thus interleave on every fourth element is performed. Numerous other precisions may be used with various instructions. Floating point values may also be mapped using a lookup table (e.g. 2-bit integers may identify lookup table entries that contain floating point values). Alternatively, floating point values may be converted between the different floating point precisions. Additional details are described further below.

The computation circuit 10 may also support an instruction for moving results from the Z memory 28 to the X memory 24 and/or Y memory 26, referred to as the extract instruction herein. The extract instruction may include converting (e.g. downsizing or down-converting) the result vector elements from the Z memory 28, and deinterleaving the results by a deinterleave specification corresponding to the extract instruction. The deinterleave specification may be based on the ratio of the result precision and the precision of the downsized vector elements. If the downsize precision is the same as the input precision of the input vectors that generated the results in the Z memory 28, the deinterleave may have the effect of reversing the original interleave, thus returning downsized vector elements to their original locations in the input vector.

The conversion and interleave/deinterleave functionality provided by the computation engine 10 may be an application programming interface (API) to the computation engine 10, in an embodiment. Software may be programmed using the upsize/downsize and interleave/deinterleave features and may be operational on the computation engine 10 independent of the underlying implementation of the computation circuit 10. If performance gains are realized over successive generations of the computation engine 10, for example, the performance gains may be realized by the software without change.

Interleaving and deinterleaving vectors may be viewed as treating a given vector as a set of vectors having a number of elements equal to the interleave/deinterleave specification, and selecting the first elements of each vector in the set and placing them in adjacent element locations, followed by the second elements of each vector in adjacent element locations, etc., until each element has been selected. That is, the interleave may include the first vector element of the overall vector, followed by the vector element that is offset in the vector by a number of elements equal to the interleave/deinterleave specification, followed by the vector element that is offset from that vector element by the number of elements equal to the interleave/deinterleave specification, etc. Upon reaching the end of the input vector, the second element of the overall vector may be included in the output, followed by the element that is offset from the second element by the number of elements within the input vector, etc. The number of elements to skip in the interleave/deinterleave processor may be referred to as the interleave/deinterleave factor.

In an embodiment, the instructions executed by the computation engine 10 may also include memory instructions (e.g. load/store instructions). The load instructions may transfer vectors from a system memory (not shown) to the X memory 24, Y Memory 26, or Z memory 28. The store instructions may write the vectors from the X and Y memories 24 and 26 to system memory. The Z memory 28 may be written to memory using the extract instruction to move the results to the X memory 24 and/or the Y memory 26, and then storing the results from the X memory 24 and/or the Y memory 26 to system memory. The system memory may be a memory accessed at a bottom of the cache hierarchy that includes the caches 14, 16, and 18. The system memory may be formed from a random access memory (RAM) such as various types of dynamic RAM (DRAM) or static RAM (SRAM). A memory controller may be included to interface to the system memory. In an embodiment, the computation engine 10 may be cache coherent with the processor 12. In an embodiment, the computation engine 10 may have access to the data cache 16 to read/write data. Alternatively, the computation engine 10 may have access to the lower level cache 14 instead, and the lower level cache 14 may ensure cache coherency with the data cache 16. In yet another alternative, the computation engine 10 may have access to the memory system, and a coherence point in the memory system may ensure the coherency of the accesses. In yet another alternative, the computation engine 10 may have access to the caches 14 and 16.

In some embodiments, the computation engine 10 may include a cache 32 to store data recently accessed by the computation engine 10. The choice of whether or not to include cache 32 may be based on the effective latency experienced by the computation engine 10 and the desired level of performance for the computation engine 10. The cache 32 may have any capacity, cache line size, and configuration (e.g. set associative, direct mapped, etc.).

In the illustrated embodiment, the processor 12 is responsible for fetching the extract instructions, computation instructions, and memory instructions and transmitting the instructions to the computation engine 10 for execution. The overhead of the "front end" of the processor 12 fetching, decoding, etc. the instructions may be amortized over the computations performed by the computation engine 10. In one embodiment, the processor 12 may be configured to propagate the instructions down the pipeline (illustrated generally in FIG. 1 as stages 20A-20N) to the point at which the instruction becomes non-speculative. In FIG. 1, the stage 20M illustrates the non-speculative stage of the pipeline. From the non-speculative stage, the instruction may be transmitted to the computation engine 10. The processor 12 may then retire the instruction (stage 20N). Particularly, the processor 12 may retire the instruction prior to the computation engine 10 completing the computation (or even prior to starting the computation, if the computation instruction is queued behind other instructions in the instruction buffer 22).

Generally, an instruction may be non-speculative if it is known that the instruction is going to complete execution without exception/interrupt. Thus, an instruction may be non-speculative once prior instructions (in program order) have been processed to the point that the prior instructions are known to not cause exceptions/speculative flushes in the processor 12 and the instruction itself is also known not to cause an exception/speculative flush. Some instructions may be known not to cause exceptions based on the instruction set architecture implemented by the processor 12 and may also not cause speculative flushes. Once the other prior instructions have been determined to be exception-free and flush-free, such instructions are also exception-free and flush-free.

In the case of memory instructions that are to be transmitted to the computation engine 10, the processing in the processor 12 may include translating the virtual address of the memory operation to a physical address (including performing any protection checks and ensuring that the memory instruction has a valid translation).

FIG. 1 illustrates a communication path between the processor 12 (specifically the non-speculative stage 20M) and the computation engine 10. The path may be a dedicated communication path, for example if the computation engine 10 is physically located near the processor 12. The communication path may be shared with other communications, for example a packet-based communication system could be used to transmit memory requests to the system memory and instructions to the computation engine 10. The communication path could also be through system memory, for example the computation engine may have a pointer to a memory region into which the processor 12 may write computation instructions. The computation engine 10 may read the instructions from the memory region. In yet another alternative, the processor 12 may be configured to provide the program counter (PC) address from which to fetch the instruction to the computation engine 10.

The instruction buffer 22 may be provided to allow the computation engine 10 to queue instructions while other instructions are being performed. In an embodiment, the instruction buffer 22 may be a first in, first out buffer (FIFO). That is, instructions may be processed in program order. Other embodiments may implement other types of buffers.

The X memory 24 and the Y memory 26 may each be configured to store at least one vector of input operands. Similarly, the Z memory 28 may be configured to store at least one computation result. The result may be an array of results at the result size (e.g. 16 bit elements or 32 bit elements). In some embodiments, the X memory 24 and the Y memory 26 may be configured to store multiple vectors and/or the Z memory 28 may be configured to store multiple result vectors. Each vector may be stored in a different bank in the memories, and operands for a given instruction may be identified by bank number.

The processor 12 fetches instructions from the instruction cache (ICache) 18 and processes the instructions through the various pipeline stages 20A-20N. The pipeline is generalized, and may include any level of complexity and performance enhancing features in various embodiments. For example, the processor 12 may be superscalar and one or more pipeline stages may be configured to process multiple instructions at once. The pipeline may vary in length for different types of instructions (e.g. ALU instructions may have schedule, execute, and writeback stages while memory instructions may have schedule, address generation, translation/cache access, data forwarding, and miss processing stages). Stages may include branch prediction, register renaming, prefetching, etc.

Generally, there may be a point in the processing of each instruction at which the instruction becomes non-speculative. The pipeline stage 20M may represent this stage for computation instructions, which are transmitted from the non-speculative stage to the computation engine 10. The retirement stage 20N may represent the state at which a given instruction's results are committed to architectural state and can no longer by "undone" by flushing the instruction or reissuing the instruction. The instruction itself exits the processor at the retirement stage, in terms of the presently-executing instructions (e.g. the instruction may still be stored in the instruction cache). Thus, in the illustrated embodiment, retirement of compute engine instructions occurs when the instruction has been successfully transmitted to the computation engine 10.

The instruction cache 18 and data cache (DCache) 16 may each be a cache having any desired capacity, cache line size, and configuration. Similarly, the lower level cache 14 may be any capacity, cache line size, and configuration. The lower level cache 14 may be any level in the cache hierarchy (e.g. the last level cache (LLC) for the processor 12, or any intermediate cache level).

Figure 2:
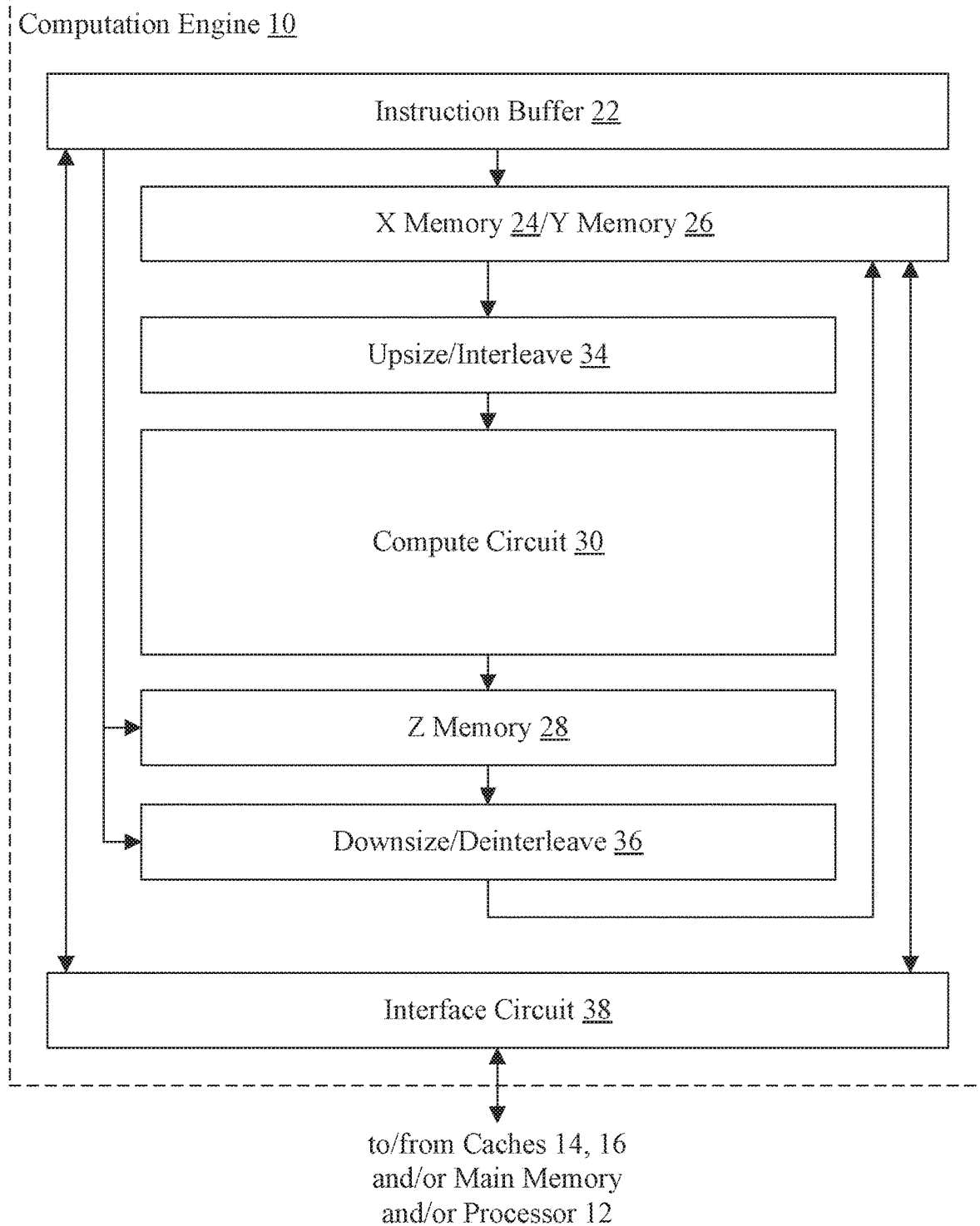
FIG. 2 is a block diagram illustrating one embodiment of the computation engine in greater detail.

Turning now to FIG. 2, a block diagram of one embodiment of the computation engine 10 in greater detail is shown. The instruction buffer 22, the X memory 24, the Y Memory 26, the compute circuit 30, and the Z memory 28 are shown. Additionally, an upsize/interleave circuit 34, a downsize/deinterleave circuit 36, and an interface circuit 38 are shown. The instruction buffer 22 is coupled to the X, Y and Z memories 24, 26 and 28, the downsize/de interleave circuit 36, and the interface circuit 38. The X and Y memories 24 and 26 are coupled to the interface circuit 38 and upsize/interleave circuit 34, which is coupled to the compute circuit 30. The compute circuit 30 is further coupled to the Z memory 28, which is coupled to the downsize/deinterleave circuit 36. The downsize/deinterleave circuit 36 is coupled to the X and Y memories 24 and 26.

The instruction buffer 22 may receive instructions via the interface circuit 38 and may communicate on the interface controlled by the interface circuit 38 to indicate acceptance of instructions, requests for instructions, etc., depending on the definition of the interface. The instruction buffer 22 may schedule instructions for execution and transmit the scheduled instructions into the pipeline of the computation engine 10. For example, instructions which read operands from the X memory 24 and/or the Y memory 26 may be transmitted to the memories (or identifiers selecting locations in the X memory 24 and/or the Y memory 26, such as addresses, may be transmitted). The instruction and operands may be provided to the upsize/interleave circuit 34, which may convert the operands to the precision used in the operation (either the result precision, or an intermediate precision, in various embodiments). The upsize/interleave circuit 34 may interleave the upsized vector elements based on the interleave specification corresponding to the instruction (e.g. the ratio of the result precision and the intermediate precision, or the ratio of the result precision and the input/original precision, if no upsize/conversion is performed). The upsized, interleaved elements may be presented to the compute circuit 30, which may perform the computation on the upsized, interleaved elements and provide a result vector having result vector elements at the result precision. The result vector may be written to the Z memory 28 (e.g. at an address specified by the instruction).

In an embodiment, the instruction buffer 22 may also issue the extract instruction through the X memory 24/Y memory 26, the upsize/interleave circuit 34, and the compute circuit 30. The extract instruction may operate as a noop flowing through those stages. At the Z memory 28, the extract instruction may read the output vector and provide the output vector to the downsize/deinterleave circuit 36. The downsize/deinterleave circuit 36 may convert the vector elements from the output vector to the target precision (specified by the extract instruction) and may deinterleave the elements according to the deinterleave specification corresponding to the extract instruction. The resulting vector may be written to the X memory 24 or the Y memory 26 specified as the target memory of the extract instruction. Alternatively, as illustrated in FIG. 2, the instruction buffer 22 may issue the extract instruction directly to the Z memory 28 and downsize/deinterleave circuit 36 without flowing throw the X memory 24/Y memory 26, the upsize/interleave circuit 34, and the compute circuit 30.

Figure 3:
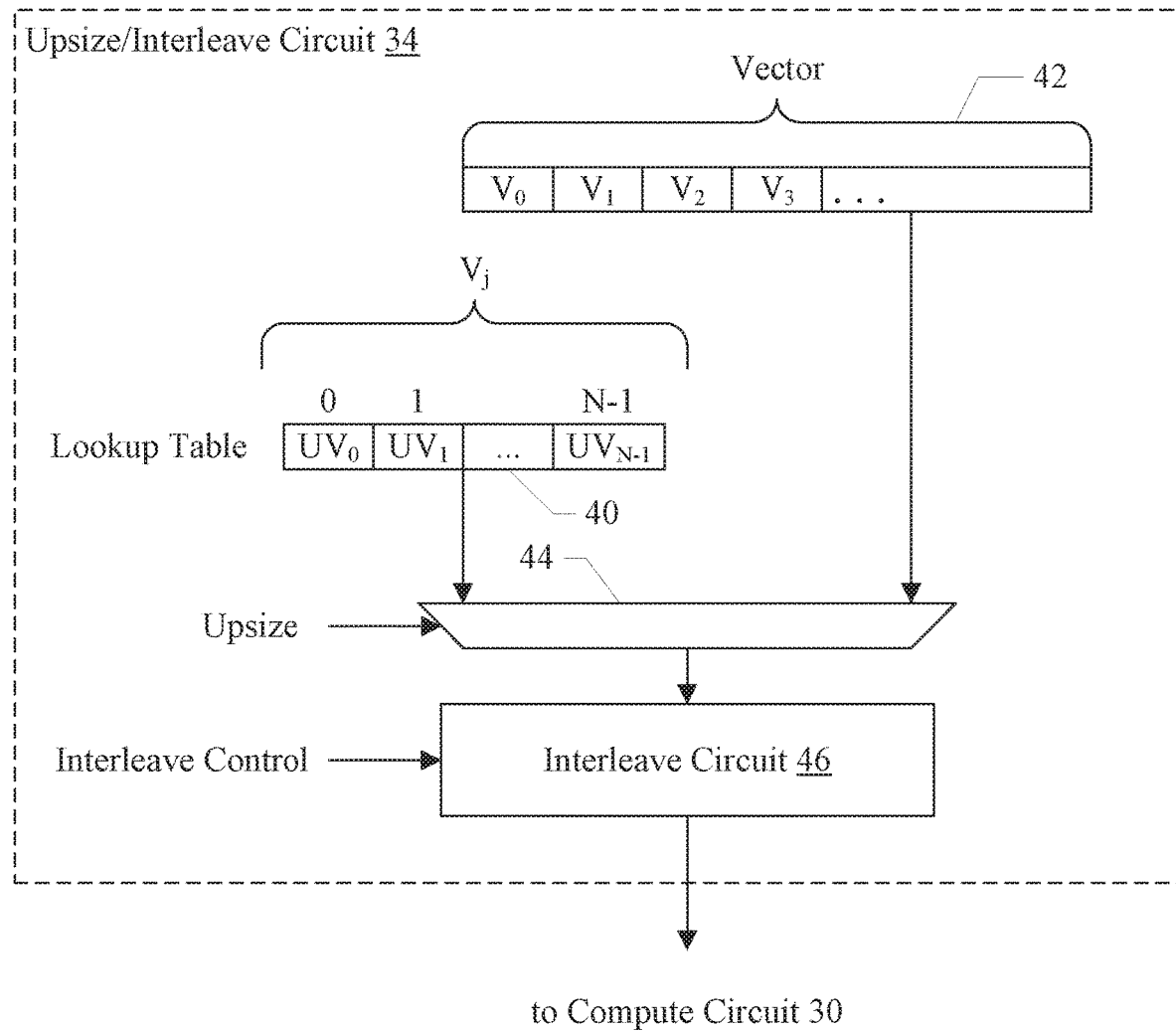
FIG. 3 is a block diagram of one embodiment of an upsize/interleave circuit shown in FIG. 2.

FIG. 3 is a block diagram of one embodiment of the upsize/interleave circuit 34 in greater detail. In the embodiment of FIG. 3, a lookup table 40 is provided which may be programmable with the upsized vector element values (e.g. values $UV_0$ to $UV_{N-1}$ in FIG. 3). Furthermore, an input vector 42 shown in FIG. 3 includes various vector elements, such as $V_0$ to $V_3$. The index into the lookup table 40 may be the vector elements from the input vector 42 (illustrated as $V_j$ above the lookup table 40). The output of the lookup table 40 and the input vector 42 may be inputs to a multiplexor (mux) 44. The mux 4 may select between the lookup table 40 and the input vector 42 to provide operands for the compute circuit 30, based on whether there is a conversion to be performed. That is, the input vector 42 may have elements of the correct precision for the instruction, in which case the input vector 42 may be selected. Alternatively, the input vector elements may need to be upsized through the lookup table 40. The upsize control (generated from the instruction and the input vector element size) on the mux 44 may control the selection.

While the upsizing is performed through a table lookup in FIG. 3, other embodiments may employ additional and/or alternative upsizing circuitry. For example, the embodiment illustrated in FIG. 3 may be used for upsizing integer values. If floating point values are upsized as well, a circuit to convert the exponent and to pad the mantissa may be used. In another embodiment, a table lookup may be used to convert small integer vector elements to floating point vector elements. Additionally, circuitry may be provided for upsizing each input operand of an instruction (e.g. there may be two input operands from one or more of the X memory 24 and the Y memory 26, in an embodiment).

The lookup table 40 may be a separate table provided in the upsize/interleave circuit 34, in an embodiment. Alternatively, the lookup table 40 may be programmed in another entry in the X memory 24/Y memory 26.

The output of the mux 44 may be coupled to the interleave circuit 46 shown in FIG. 3. The interleave circuit 46 may be responsible for interleaving the vector elements according to the interleave control (derived from the interleave specification corresponding to the instruction). Logically, the interleave circuit may be implemented as a series of N to 1 muxes, where N is the number of supported interleave specifications, and the inputs to each mux are the vector elements for respective positions in the vector to be provided to the computer circuit 30. However, actual implementations may vary.

It is noted that, while specific circuitry is shown in FIG. 3 corresponding to one embodiment, other embodiments may implement other constructions (e.g. interleave before upsizing, or a merged interleave/upsize structure may be used).

Figure 4:
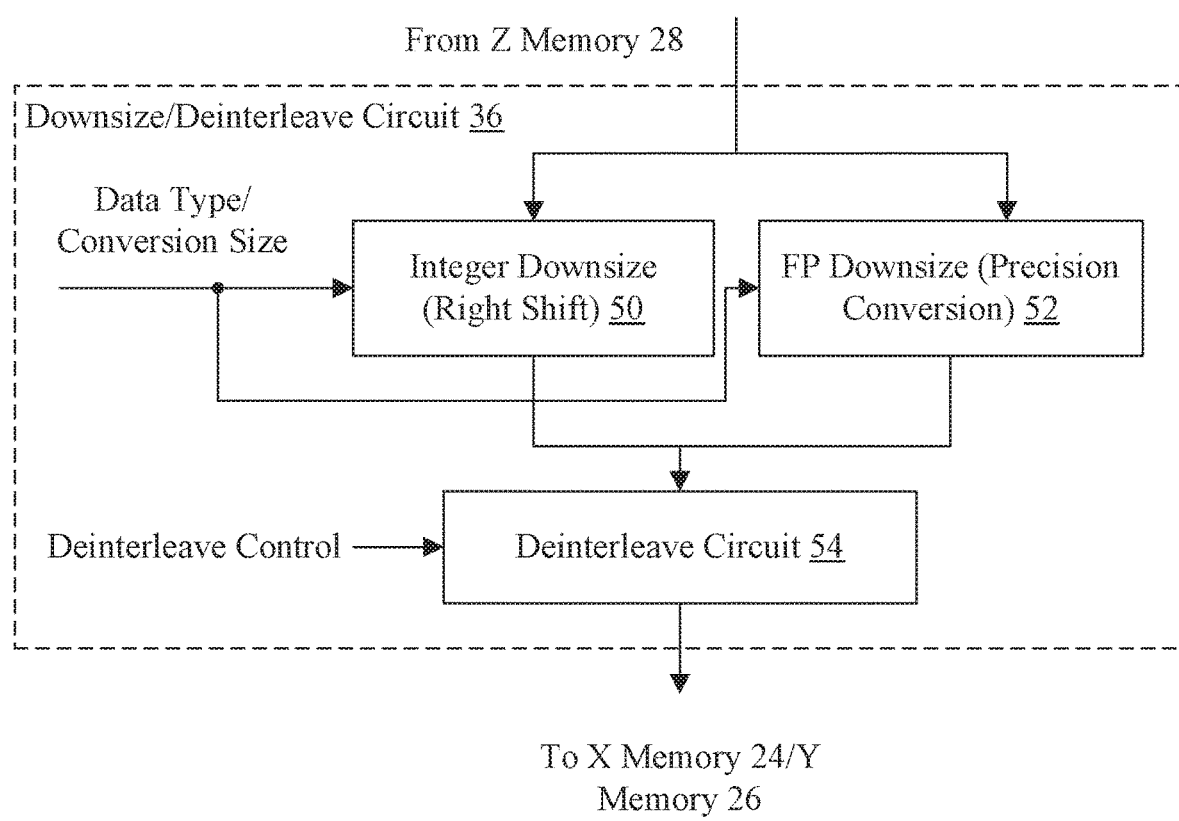
FIG. 4 is a block diagram of one embodiment of a downsize/deinterleave circuit shown in FIG. 2

Turning now to FIG. 4, a block diagram of one embodiment of a downsize/deinterleave circuit 36 is shown in greater detail. In the illustrated embodiment, the downsize/deinterleave circuit 36 includes an integer downsize circuit 50, a floating point downsize circuit 52, and a deinterleave circuit 54. The downsize circuits 50 and 52 are coupled to the Z memory 28 and to the deinterleave circuit 54. The downsize circuits 50 and 52 receive a data type and a conversion size control, and the deinterleave circuit receives a deinterleave control.

The integer downsize circuit 50 may implement integer downsizing. The integer downsizing may be a right shift by the number of bits to be removed, and a truncation to the new size. In an embodiment, rounding could also be used instead of truncation. For example, if the result is 16 bits of precision and the downsize is to 8 bits, the vector elements from the Z memory 28 may each be right shifted by 8 bits and truncated (or rounded) to 8 bits. The floating point downsize circuit 52 may include reducing the number of mantissa bits (truncation or rounding) and adjusting the exponent from a higher precision format to a lower precision format.

The resulting downsized (converted) vector elements may be provided to the deinterleave circuit 54, which may deinterleave the results based on the deinterleave control (derived from the extract instruction's deinterleave specification). Similar to the interleave circuit 46, the deinterleave circuit 54 may logically be a set of N to 1 muxes based on the deinterleave amount, with connections to the various vector elements that may be selected into a given vector element position based on the supported deinterleave specifications.

It is noted that, while specific circuitry is shown in FIG. 4 corresponding to one embodiment, other embodiments may implement other constructions (e.g. deinterleave before downsizing, or a merged deinterleave/downsize structure may be used).

Figure 5:
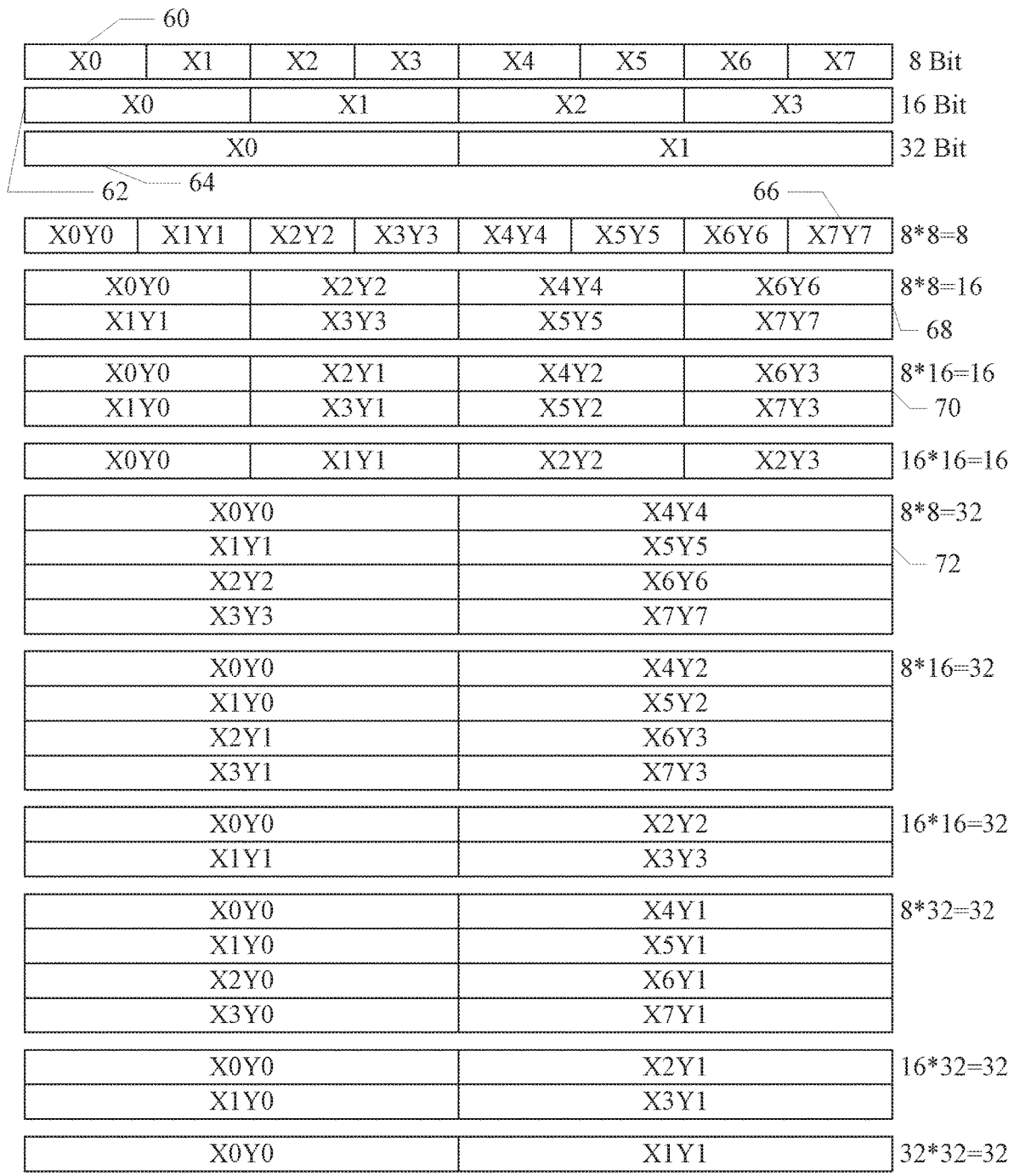
FIG. 5 is a block diagram illustrating various input operand precisions and output result precisions that may be supported by one embodiment of the computation engine and/or compute circuit.

FIG. 5 is an example of supported interleave specifications, for an embodiment. In this embodiment, vector element precisions from 8 bits to 32 bits are supported for both input vector elements (after upsizing, if any) and output vector elements. At the top of FIG. 5, an initial vector entry in the X memory 24 is shown for 8-bit, 16-bit, and 32-bit vector elements sizes. Thus, a vector may have up to eight 8-bit vector elements X0 to X7, four 16-bit vector elements X0 to X3, or two 32-bit vector elements X0 to X1 (reference numerals 60, 62, and 64, respectively).

Based on these options, the various examples of interleaving of the elements for a multiplication operation are shown. The notation on the right of each example is (X vector element precision)*(Y vector element precision)=(Z vector element precision). For each case of differing precisions for X and Y, X is show with the smaller precision. The opposite case (Y with the smaller precision) may be similar, but the element numbers of X and Y would be swapped to find the arrangement of vector elements in the result.

Accordingly, the first example 66 is an 8-bit vector element precision for X, Y, and Z. Since the precisions are the same, the interleave control is 1 (e.g. input and output order of vector elements is the same). Therefore, the first vector element in the result is X0Y0, in the left-most vector element position, followed by X1Y1, etc. through X7Y7. In the second example 68, both X and Y element precisions are 8 bits, but the result precision is 16 bits. Thus, the interleave for both X and Y input vectors is 2 (ratio of result precision and input precision). For the second example 68, two entries (rows) of the Z memory 28 are used to store the result. The first row has the first set of interleaved elements (X0Y0, X2Y2, X4Y4, and X6Y6). The second row has the second set of interleaved elements (X1Y1, X3Y3, X5Y5, and X7Y7). In the third example 70, there are again two rows of results, but the Y precision is 16 bits (equal to the Z precision) while the X precision is 8 bits. The interleave for the X operand is 2, and the interleave for the Y operand is 1 (no interleave). There are also half as many Y elements (Y0 to Y3) as X elements (X0 to X7). Thus, the first row of the Z memory is X0Y0, X2Y1, X4Y2, and X6Y3. The second row of the Z memory is X1Y0, X3Y1, X5Y2, and X7Y3. As mentioned above, if the Y precision were 8 bits and the X precision were 16 bits, the element numbers would be swapped. That is, the first row of the Z memory would be X0Y0, X1Y2, X2Y4, and X3Y6 and the second row of the Z memory would be X0Y1, X1Y3, X2Y5, and X3Y7.

A similar pattern may be observed for each remaining combination of input and output precisions. The number of rows of Z memory consumed by the result may be the ratio of the output precision and the smaller input precision.

FIG. 6 illustrates certain examples of the deinterleaving of Z memory results in response to the extract instruction, for several examples shown in FIG. 5. In an embodiment, deinterleave specifications of 1, 2, 4, 8, 16, and 32 may be supported. Other embodiments may support any deinterleave specifications, including subsets of the above, supersets of the above and other deinterleave specifications, and/or subsets of the above and additional deinterleave specifications.

The first example in FIG. 6 corresponds to the example 68 in FIG. 5. In this case, downsizing from 16 bits to 8 bits is performed, and the deinterleave is 2. Accordingly, the resulting vector 80 is X0Y0 (converted to 8 bits) adjacent to X1Y1 (converted to eight bits), which is adjacent to X2Y2 (converted to 8 bits) etc., to X7Y7 as shown in FIG. 6. Compared to an initial vector element order at 8 bits (e.g. X0 to X7 in FIG. 5, reference numeral 60), the result vector elements have been returned to corresponding positions in the resulting vector 80.

The second example in FIG. 6 corresponds to the example 70 in FIG. 5, and again the conversion is from 16 bits to eight bits. A deinterleave of 2 is used, corresponding to the interleave of the smaller input vector elements (e.g. X vector elements) from the example 70. The resulting vector 82 includes X0Y0 (converted to 8 bits) in the first vector element position, with X1Y0 adjacent (converted to 8 bits), and the X2Y1 adjacent to X1Y0 (and converted to 8 bits), etc. up through X7Y3. Similar to the example 80, the vector elements of the resulting vector 82 that include products from a given element position Xn are in the same element position of the output vector 82 and Xn is in the input vector position. Similarly, the products that include Ym in the resulting vector 82 are in element positions that correspond to the (larger) Ym element position in the input vector.

The third example in FIG. 6 corresponds to the example 72 shown in FIG. 5. In this example, the conversion is from 32 to 8 bits and the deinterleave is four. Thus, the resulting vector 84 includes X0Y0 (converted to 8 bits) adjacent to X1Y1 (converted to 8 bits), which is adjacent to X2Y2 (converted to 8 bits), etc. through X7Y7 (converted to 8 bits). Each other example that includes more than one row of Z memory 28 may operate in a similar fashion. If a downsize is not also specified by the extract instruction, the resulting vector may occupy more than one row of the X memory 24 or memory 26, in an embodiment.

FIG. 7 is a table 90 illustrating an exemplary instruction set for one embodiment of the computation engine 10. Other embodiments may implement any set of instructions, including subsets of the illustrated set, other instructions, a combination of subsets and other instructions, etc.

The memory operations for the computation engine 10 may include load and store instructions. Specifically, in the illustrated embodiment, there are load and store instructions for the X and Y memories, respectively. In an embodiment, the X and Y memories may have multiple banks for storing different vectors. In such an embodiment, there may be multiple instructions to read/write the different banks or there may be an operand specifying the bank affected by the load/store X/Y instructions. In each case, an X memory bank may store a pointer to memory from/to which the load/store is performed. The pointer may be virtual and may be translated by the processor 12 as discussed above. Alternatively, the pointer may be physical and may be provided by the processor 12 post-translation.

In the case of the Z memory 28, the extract instruction may be used to write Z memory results to the X memory 24 (or Y memory 26). The <p> parameter may indicate the downsizing/down convert to be performed, and there may be an explicit deinterleave control in this embodiment as well. The result may be stored in the X memory entry Xn.

The compute instruction may perform a computation on the vector elements in the X and Y memory entries Xn and Yn, respectively. The input precisions for X and Y may be <px> and <py>, respectively, and the output precision may be <pz>. The interleave specifications for X and Y may be specified by <ix> and <iy>, or may be implicit in the ratios of <pz> to <px> and <py>, respectively. The table operand specifies an optional lookup table, if used.

A variety of compute instructions may be supported in various embodiments. For example, a multiply-accumulate compute instruction may be used in which X and Y vector elements are multiplied and added to the current value in the resulting Z memory location, then written back to the Z memory location. The accumulation may be add or subtract, or both varieties may be used. Add/Subtract and accumulate may be supported. Matrix multiplication (where the vector elements are interpreted as rows or columns of matrix elements) in a multiply and accumulate operation may be performed.

Figure 8:
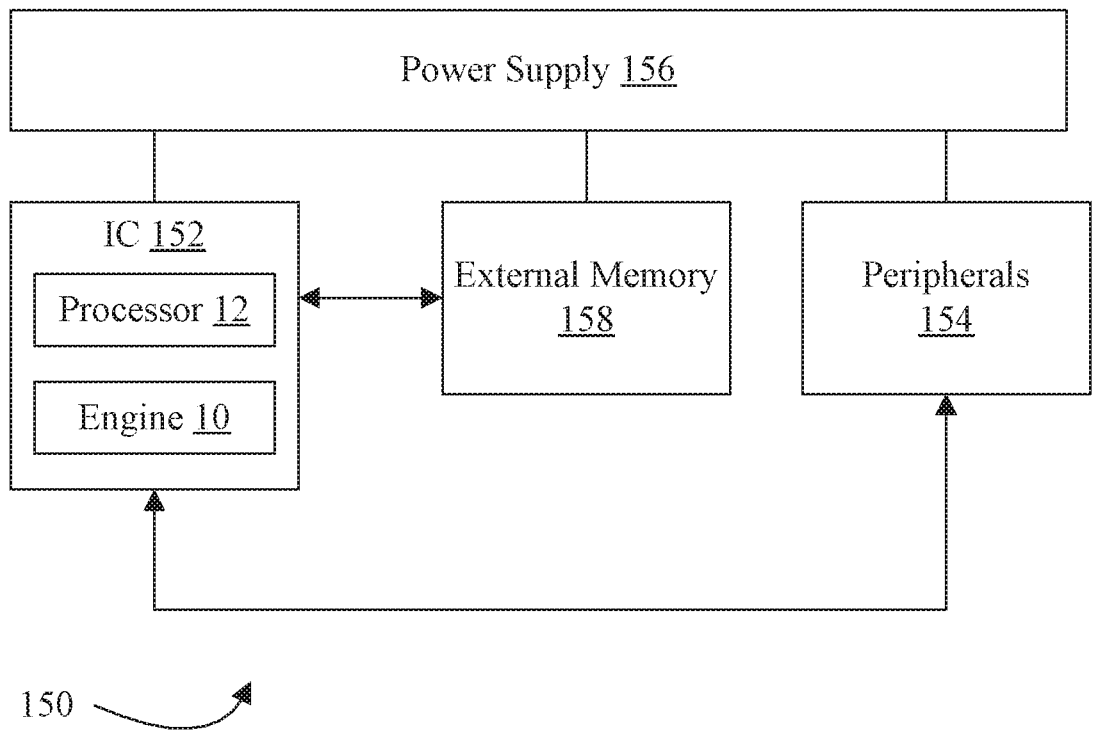
FIG. 8 is a block diagram of one embodiment of a system.

FIG. 8 is a block diagram of one embodiment of a system 150. In the illustrated embodiment, the system 150 includes at least one instance of an integrated circuit (IC) 152 coupled to one or more peripherals 154 and an external memory 158. A power supply 156 is provided which supplies the supply voltages to the IC 152 as well as one or more supply voltages to the memory 158 and/or the peripherals 154. The IC 152 may include one or more instances of the processor 12 and one or more instances of the computation engine 10. In other embodiments, multiple ICs may be provided with instances of the processor 12 and/or the computation engine 10 on them.

The peripherals 154 may include any desired circuitry, depending on the type of system 150. For example, in one embodiment, the system 150 may be a computing device (e.g., personal computer, laptop computer, etc.), a mobile device (e.g., personal digital assistant (PDA), smart phone, tablet, etc.), or an application specific computing device capable of benefitting from the computation engine 10 (e.g., neural networks, LSTM networks, other machine learning engines including devices that implement machine learning, etc.). In various embodiments of the system 150, the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 152 in a chip-on-chip or package-on-package implementation.

Figure 9:
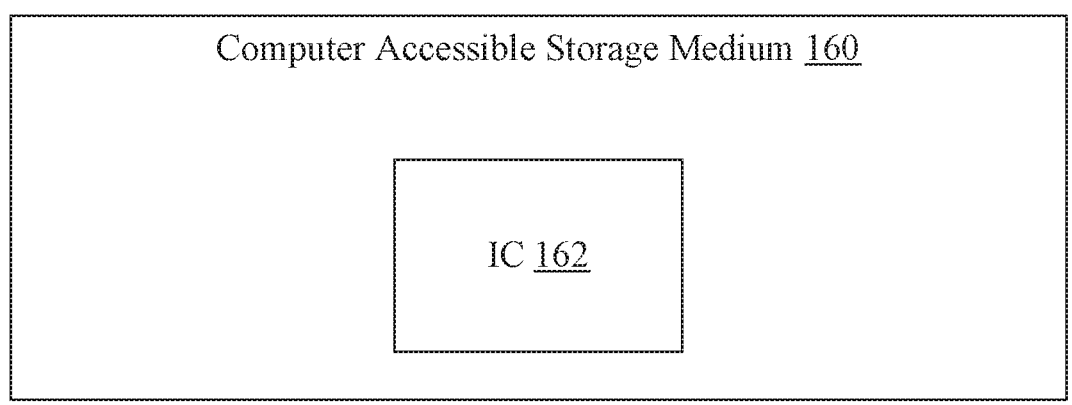
FIG. 9 is a block diagram of one embodiment of a computer accessible storage medium.

FIG. 9 is a block diagram of one embodiment of a computer accessible storage medium 160 storing an electronic description of the IC 152 (reference numeral 162) is shown. More particularly, the description may include at least the computation engine 10 and/or the processor 12. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the IC 152 stored on the computer accessible storage medium 160 may be a database which can be read by a program and used, directly or indirectly, to fabricate the hardware comprising the IC 152. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 152. The netlist may then be placed and routed to produce a data set describing geometric shapes to be applied to masks. The masks may then be used in various semiconductor fabrication steps to produce a semiconductor circuit or circuits corresponding to the IC 152. Alternatively, the description 162 on the computer accessible storage medium 300 may be the netlist (with or without the synthesis library) or the data set, as desired.

While the computer accessible storage medium 160 stores a description 162 of the IC 152, other embodiments may store a description 162 of any portion of the IC 152, as desired (e.g. the computation engine 10 and/or the processor 12, as mentioned above).

Numerous variations and modifications will become apparent to those skilled in the art once the above disclosure is fully appreciated. It is intended that the following claims be interpreted to embrace all such variations and modifications.

What is claimed is:

1. A system comprising:
a processor configured to issue a first instruction to a computation engine;
the computation engine coupled to the processor, wherein:
the computation engine comprises:
a first memory storing, during use, a plurality of input vectors that include first vector elements having a first precision of a first data type, and
a second memory storing a plurality of output vectors, during use, that include second vector elements having a second precision of the first data type;
the computation engine is configured to convert the first vector elements of a first input vector of the plurality of input vectors to third vector elements having a third precision and the first data type, wherein the first input vector is specified by the first instruction;
the computation engine is configured to interleave the third vector elements according to an interleave specification corresponding to the first instruction, wherein the interleave specification is based on a ratio of the second precision to the third precision, and wherein a pair of adjacent interleaved third vector elements correspond to a pair of non-adjacent first vector elements in the first input vector when the ratio is greater than one, wherein a first one of the pair of non-adjacent first vector elements and a second one of the pair of non-adjacent first vector elements are offset within the first input vector by a number of elements when the ratio is greater than one, and wherein the number of elements is based on the ratio; and
the computation engine is configured to perform a computation specified by the first instruction on the interleaved third vector elements of the first input vector and fourth vector elements of a second input vector specified by the first instruction, and to write results to the second memory at the second precision.

2. The system as recited in claim 1 wherein the processor is configured to issue a second instruction to the computation engine, wherein the second instruction specifies a third vector of the plurality of output vectors in the second memory, and wherein the computation engine is configured, responsive to the second instruction, to:
convert fifth vector elements of the third vector from the second precision and the first data type to sixth vector elements having the first precision and the first data type; and
deinterleave the sixth vector elements according to a deinterleave specification of the second instruction to form a fourth vector.

3. The system as recited in claim 2 wherein the computation engine is configured to write the fourth vector to the first memory.

4. The system as recited in claim 2 wherein the deinterleave specification is based on the ratio of the second precision to the third precision.

5. The system as recited in claim 1 wherein the interleave specification is explicitly specified in the first instruction.

6. The system as recited in claim 1 wherein the interleave specification is implicit in the first precision and the third precision of the first instruction.

7. The system as recited in claim 1 wherein the third precision is greater than the first precision.

8. The system as recited in claim 7 wherein the third precision is equal to the second precision.

9. The system as recited in claim 7 wherein the third precision is less than the second precision.

10. The system as recited in claim 1 wherein the computation engine comprises a lookup table, and wherein the first vector elements are indexes into the lookup table, and wherein the lookup table is programmed with the third vector elements.

11. The system as recited in claim 1 wherein the second input vector is one of the plurality of input vectors, and wherein the computation engine is configured to convert the first vector elements to the third vector elements responsive to the first instruction.

12. A circuit comprising:
an input memory storing one or more input vectors, the input vectors comprising a first precision of a first data type;
an output memory storing one or more output vectors, the output vectors comprising a second precision of the first data type, wherein the second precision is greater than the first precision;
a first convert circuit coupled to the input memory, wherein the first convert circuit converts first vectors having first vector elements of the first precision and the first data type to second vectors having second vector elements of a third precision and the first data type, wherein the first convert circuit is configured to interleave the second vector elements according to an interleave specification for a given instruction, wherein the interleave specification is based on a ratio of the second precision to the third precision, and wherein a pair of adjacent vector elements in the second vectors correspond to a pair of non-adjacent first vector elements in the first vector when the ratio is greater than one, wherein a first one of the pair of non-adjacent first vector elements and a second one of the pair of non-adjacent first vector elements are offset within the first vector by a number of elements when the ratio is greater than one, and wherein the number of elements is based on the ratio;
a compute circuit coupled to the first convert circuit, the input memory, and the output memory, wherein the compute circuit is configured to perform computations on vectors having vector elements of the third precision and to write results at the second precision to the output memory; and
a second convert circuit coupled to the output memory, wherein the second convert circuit is configured to convert third vector elements of a third vector having the second precision and the first data type from the output memory to fourth vector elements of a fourth vector having the first precision and the first data type, and wherein the second convert circuit is configured to deinterleave the fourth vector elements to form the fourth vector.

13. The circuit as recited in claim 12 wherein the first convert circuit and the compute circuit operate responsive to a first instruction received by the circuit that includes the interleave specification that controls an interleave of the second vector elements, and wherein the second convert circuit operates responsive to a second instruction received by the circuit that includes a deinterleave specification that controls the deinterleave of the fourth vector elements.

14. The circuit as recited in claim 13 wherein the interleave specification is explicitly specified in the first instruction and the deinterleave specification is explicitly specified in the second instruction.

15. The circuit as recited in claim 13 wherein the interleave specification is implicit in the first precision and the second precision of the first instruction.

16. The circuit as recited in claim 12 wherein the second convert circuit is configured to write the fourth vector to the input memory.

17. The circuit as recited in claim 13 wherein the deinterleave specification is based on the ratio of the second precision to the first precision, and wherein non-adjacent vector elements of the third vector are adjacent in the deinterleaved fourth vector elements when the ratio is greater than one.

18. A system comprising:
a processor configured to issue a first instruction to a computation engine;
the computation engine coupled to the processor, wherein:
the computation engine comprises:
a first memory storing, during use, a plurality of input vectors that include first vector elements having a first precision of a first data type, and
a second memory storing a plurality of output vectors, during use, that include second vector elements having a second precision of the first data type;
the computation engine is configured to convert the second vector elements of a first vector of the plurality of output vectors to third vector elements having the first precision and the first data type, wherein the first vector is specified by the first instruction;
the computation engine is configured to deinterleave the third vector elements of the first vector according to a deinterleave specification in the first instruction, wherein the deinterleave specification is based on a ratio of the second precision to the first precision, and wherein a pair of adjacent deinterleaved third vector elements correspond to a pair of non-adjacent second vector elements in the first vector when the ratio is greater than one, wherein a first one of the pair of non-adjacent second vector elements and a second one of the pair of non-adjacent second vector elements are offset within the first vector by a number of elements when the ratio is greater than one, and wherein the number of elements is based on the ratio; and the computation engine is configured write the deinterleaved third vector elements to the first memory at the first precision.

19. The system as recited in claim 18 wherein the deinterleave specification is explicitly specified in the first instruction.

* * * * *